March 27, 1962     O. MOKLEBUST     3,026,627
ROTARY CYLINDRICAL HEAT TRANSFER DEVICE
Filed Jan. 4, 1960
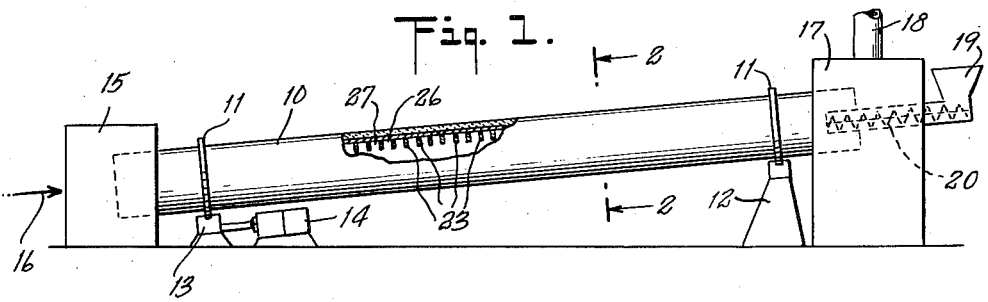
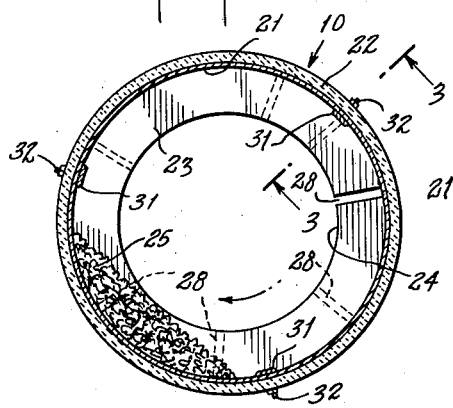
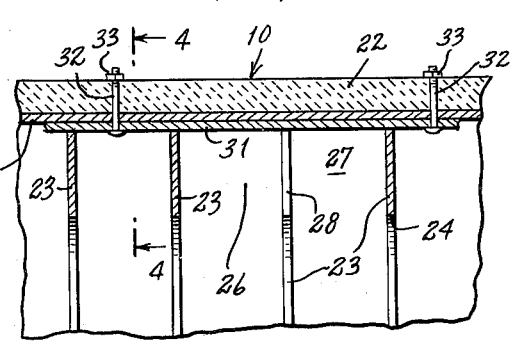
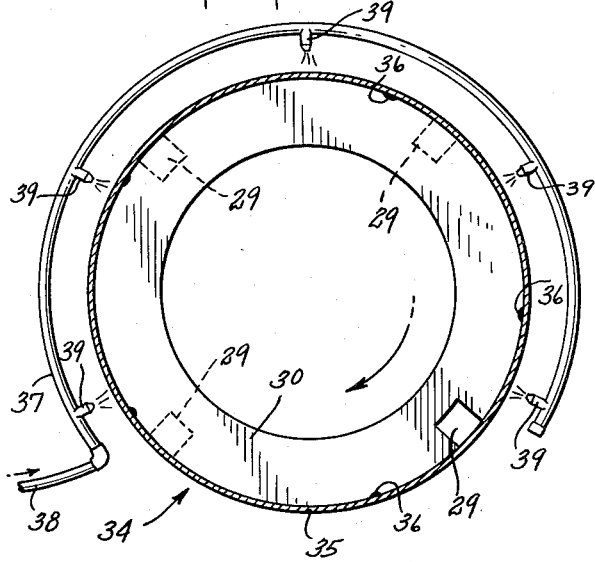
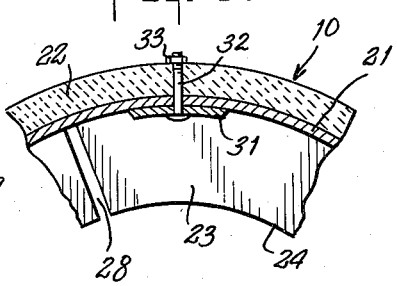

United States Patent Office 3,026,627
Patented Mar. 27, 1962

3,026,627
ROTARY CYLINDRICAL HEAT TRANSFER DEVICE
Olav Moklebust, Birmingham, Ala., assignor to R-N Corporation, New York, N.Y., a corporation of Delaware
Filed Jan. 4, 1960, Ser. No. 438
2 Claims. (Cl. 34—136)

The present invention relates to a rotary cylindrical heat transfer device having spaced annular plates, and more particularly to such a device, which may be a kiln for conducting an operation in which solid material is to be heated including, for example, endothermic reactions with respect to the solid material or may be a cooling device in which solid material is to be cooled during its passage therethrough, including a device for conducting exothermic reactions as to the solid material.

It has been found in the construction of kilns and/or cooling devices that a rotary drum-type device is quite efficient in the handling of solid material in a flowable condition, which may be anywhere from fine particle size material to relatively large lump material or any mixture thereof. In many such devices it is common to conduct endothermic reactions including, for example, the reduction of oxide-type ores where the ore may be mixed with a reducing agent, such as some form of carbon, and the temperature may be controlled so as to cause the reduction of the ore. A device operating in this way is disclosed in the patent to Moklebust, No. 2,829,042, issued April 1, 1958, and entitled "Furnacing Process." In accordance with this patent, iron ore mixed with carbonaceous material is passed through a rotary kiln and heat is supplied in a manner such that the temperature along the kiln may be quite accurately controlled for the reduction of the iron ore, or a major portion at least thereof, to a metallic state. This is an example of an endothermic reaction. It is also common, in the operation of rotary kilns, to use them for the making of Portland cement, which is also a substantially endothermic reaction.

On the other hand, it is conventional to use a rotary cylindrical device through which solid materials may be passed, substantially as in a rotary kiln, for the conducting of exothermic reactions and/or for cooling solid materials being passed through such a device. Under these circumstances, the important element, from the point of view of the present invention, is that heat must be abstracted from the solid material. In either case, and from a generic point of view, there must be a heat transfer with respect to the solid material in order to supply heat to such material or to abstract heat therefrom.

It has been attempted in the past to increase the rate of heat transfer with respect to solid material in rotary cylindrical devices of these kinds to provide lifting means which are attached in some manner to the inside of the rotary device and act to lift up substantial portions of the solid material incident to the rotation of the device as a whole and then drop it down through the gases passing through the device onto the mass of solid material being turned over and over adjacent to the bottom portion of the device. This expedient has the undesired characteristic that if used in conjunction with material containing substantial proportions of fines and if there is a substantial current of gases passing through the center portion of the cylindrical device, large amounts of the fine material is picked up by the gases and carried out of the kiln or cooler as the case may be, and must be removed from the gases by suitable means, such as cyclone separators and the like, which are effective for removing a large part, but usually something less than all, the fine solid material being carried by the gases. The remainder is usually distributed around the vicinity of the place where the device is operated and constitutes a nuisance as well as involving a loss of the material being treated.

The present invention seeks to improve the heat transfer characteristics of apparatus of this kind by providing within the rotary cylindrical device a plurality of annular plates, each usually planiform in character, and usually of some metallic construction so as to have relatively high heat conductivity. These plates are located concentric with the rotary device and are spaced along the axis thereof adjacent to the outer walls in each instance, the annular plates extending part way toward the axis of the rotary device, but having their inner peripheries terminating substantially short of such axis, so as to leave a substantial size free passage through the center of the device for the free flow of gases which may be used to supply heat to or convey heat away from the solid materials being treated. Under these circumstances, the several annular plates serve in the heat transmission path between the solid materials on the one hand, and the gases passing axially through the rotary device, so as to assist in the heat transmission between the solid material and the gases in either direction in accordance with the desired way the device is being operated, i.e. either to supply heat to or to abstract heat from the solid material.

In accordance with the present invention, the solid material being transmitted through the device is supplied to the upper end of the rotary cylindrical device, which is arranged in a position with its axis approaching the horizontal, but with one end somewhat higher than the other. The solid material will then be moved through the device, from the higher end to the lower end, by gravity coupled with the rotation of the device.

It is also usually contemplated that the amount of solid material may be less than that required to extend inwardly of the inner peripheries of the plates aforesaid, so that the solid material will lie and be moved preferably wholly, between the plates. Under these circumstances, it is necessary that the plates have passages which may be in the form of radial slots permiting the passage of solid material from the annular space between one pair of adjacent plates to the annular space next adjacent thereto toward the lower end of the cylindrical device. These passages or radial slots are preferably offset from one another in adjacent plates, so that the solid materials must move a substantial distance around the axis of the cylindrical device before moving from one annular groove as aforesaid between adjacent plates to the next, substantially contiguous, annular groove.

It is further contemplated that in the case of a device wherein heat is to be imparted to the solid materials, for example, when an endothermic reaction is to be conducted with respect thereto, the cylindrical device may be in effect a rotary kiln and may be suitably insulated to prevent undesired heat loss through the walls thereof as is conventional in rotary kiln constructions. Under these circumstances, the annular plates of the present invention are preferably formed into one or more cage-like constructions which are substantially independent of the kiln itself as by securing a plurality of the plates together into such a construction by the use of a plurality of longitudinally extending members which are secured to some and possibly to all the plates through or past which they respectively extend. Such longitudinally extending members are preferably so formed as to minimize their tendency to lift the solid materials and cause such materials to fall through the gases passing through the center of the kiln as aforesaid. At the same time, the one or more cages formed of the plates as aforesaid in any single kiln may be secured to the outer shell or walls of the kiln by a minimum of anchoring means, so as to minimize the heat loss through such walls.

On the other hand, when the cylindrical device is used for abstracting heat from the solid materials, and it is desired merely that the heat be dissipated, this can be done in either of two ways. One of these is to circulate through the center of the device relatively cool gases, including air, instead of relatively hot gases as are conventionally used in the operation of rotary kilns. The other general approach to the problem in accordance with the present invention is that the heat shall be dissipated through the walls of the cylindrical device, in which case such walls and the plates aforesaid are both preferably of metallic material having relatively high heat conductivity characteristics and the plates are secured to the cylindrical walls, for example, by welding or the like, so as to provide for a maximum rate of heat transmission from the plates to and through the outside walls. The outside walls may then be cooled, for example, by bringing a cooling liquid into contact therewith as by spraying water onto such walls or by having portions of the cylindrical device dip into a bath of water and providing on the outside rib-like structures which will cause the water to be kept in contact with the outside for a maximum time during the rotation. The particular means for bringing the cooling liquid into contact with the outer walls is per se no part of the present invention.

Other and more detailed features of the present invention will become apparent from a consideration of certain preferred embodiments thereof, which are hereinafter described in detail and which are illustrated in the accompanying drawings, in which:

FIG. 1 is a somewhat diagrammatic view, principally in elevation, but with some parts broken away and in section, showing a rotary device such as a kiln constructed and arranged for operation in accordance with the present invention;

FIG. 2 is a view on a somewhat enlarged scale and in section on the line 2—2 of FIG. 1, showing the annular plates in place inside a kiln structure and showing the solid materials being handled therein;

FIG. 3 is a fragmentary view in section on the line 3—3 of FIG. 2, and on a still larger scale, showing the construction of a plurality of the plates and their attachment to the walls of a kiln, wherein these plates are built up into a cage-like construction which is in turn attached to the kiln;

FIG. 4 is a fragmentary view in section on the line 4—4 of FIG. 3 and corresponding generally to a part of FIG. 2, but on a substantially larger scale than in FIG. 2; and FIG. 5 is a view similar to FIG. 3, but illustrating a modified device, wherein either an endothermic operation or a straight cooling operation is to be carried on with the heat to be dissipated through the outer walls of the device and carried away by water or other cooling liquid sprayed onto such walls.

Turning now to the drawings, and particularly to FIGS. 1–4 thereof, there is illustrated a rotary kiln 10 having bands 11 thereon by which the kiln may be suitably supported and rotated, conventional supporting means being shown diagrammatically at 12 and a supporting and rotating means at 13, the latter being driven from a suitable prime mover such as an electric mover with speed reducing equipment generally indicated at 14. The kiln 10 comprises a substantially cylindrical device mounted to rotate with its axis approaching the horizontal, but with its right hand end as seen in FIG. 1 somewhat higher than the left hand end, so as gradually to move down to the lower or left hand end thereof the solid material supplied to the kiln 10 and so that such solid material may be discharged from the rotary kiln in a conventional manner. The left hand end of the kiln 10, as shown in FIG. 1, is surrounded by a combustion chamber 15 to which fluid fuel is supplied as indicated by an arrow 16, so as to provide for the generation of hot gases, including products of combustion, which will move longitudinally of the kiln, from left to right as seen in FIG. 1 to an exhaust chamber 17 arranged to surround and envelop the right hand end of the kiln as seen in this figure and provided with a conventional stack or other exhaust means 18. Solid materials may be introduced into the kiln from a hopper 19 through a suitable feeding device indicated as a helical screw device 20. Inasmuch as such devices are now quite common in the art, this device is shown only diagrammatically in FIG. 1. The means for removing the solid materials from the lower end of the kiln shown at the left of FIG. 1 are not illustrated in detail, but may take any conventional form, for example, that illustrated more or less diagrammatically in the Moklebust patent aforesaid.

The kiln 10, as shown in FIGS. 2, 3 and 4, may be constructed as a substantially cylindrical metallic shell 21 surrounded by suitable insulation 22 of any desired character. It will be understood that the purpose in the case of the device shown in FIGS. 1–4 is to provide a device of the character of the rotary kiln, wherein the solid material is to be treated in such a way that heat must be supplied thereto either to heat the material initially, to fire it for some special purpose, and/or for compensating for any heat required for the conducting of an endothermic reaction with respect to the solid materials. One example of such an endothermic reaction is in the reduction of iron ore, as set out in substantially greater detail in the Moklebust patent aforesaid.

As will be seen from the foregoing, the problem in devices of the character particularly hereinabove set forth is to transmit heat to the solid material. The heat under these circumstances is often, if not wholly, derived from the heated gases passing through the kiln. Under the circumstances, the problem is to increase the heat transfer from these heated gases to the solid material. For this purpose there is provided in accordance with the present invention a plurality of substantially planiform annular plates 23, which are disposed in planes substantially perpendicular to the axis of the kiln 10 and adjacent to the inside periphery thereof. They are also spaced from another in the direction of the kiln axis as clearly shown in FIGS. 1 and 3, and further are so formed that their inner peripheries shown at 24 in FIGS. 2 and 4 extend toward the kiln axis, but are substantially short of it, so as to leave a large central substantially circular or cylindrical passage through the kiln for the flow of hot gases. At the same time, the several plates 23 are sufficiently wide in a radial direction as usually to project from the solid material in the kiln, which is shown diagrammatically at 25 in FIG. 2. In any event, the plates 23 extend into the path of the hot gases to a substantial extent, at least in those portions above the solid material bed. Thus, the operation is one in which the several plates 23 pick up heat from the heated gases passing through the kiln by convection and transmit this heat by conduction to the solid material. There is also possibly some heat transferred by radiation, although there is believed to be relatively minor in amount. In any event, the presence of the plates arranged as aforesaid in the kiln serves substantially to augment the rate of heat transfer from the gases to the solid material.

It is usually desired, in accordance with the present invention, that the solid material may pass from one end of the kiln to the other without passing over the inner periphery 24 of any of the plates 23. In order to attain this end, passages are provided, at least one for each plate 23, through which solid material may pass from one annular space, as the space 26 between adjacent plates 23, to the next such annular space 27 between such plates in the direction of the lower end of the kiln. These spaces are indicated on FIGS. 1 and 3 to show in general how they are related to the kiln parts. In the form of the invention shown in FIGS. 1–4, the passages between the adjacent spaces as 26 and 27 through each of the plates 23, is shown as a radial slot 28; while in the form of FIG. 5 hereinafter to be described in detail, passages are shown for the same purpose as apertures 29, which do not extend to the inner periphery of annular plates 30 which are equivalent to the plates 23 of FIGS. 1–4. At least one passage is formed in each of the plates 23 or 30, so that solid material may flow from one end of the kiln to the other without ever passing over or radially inside of the inner periphery 24 of any of the plates 23 or the corresponding plates 30. It is preferred, however, in accordance with the present invention that the passages 28 or 29 shall be radially offset from one another as indicated by the dull and dotted lines showing the passages 28 in different plates 23 in FIG. 2 and the corresponding showing of the passages 29 in FIG. 5. This insures that the solid material shall flow around the kiln axis a substantial distance in passing from one annular space, as 26, to the next succeeding annular space as 27 and not be allowed to short-circuit its way in a path of any substantial distance parallel to the axis of the kiln. The number of such passages and the angle of the kiln with respect to the horizontal, as well as the speed of rotation thereof jointly serve to control the rate of solid material movement through the kiln. This serves to assure adequate and complete treatment of the material during its passage through the kiln.

In the form of the device of FIGS. 1–4 where heat is to be imparted to the solid material or transmitted to such material, it is, of course, desirable that heat losses through the kiln walls be minimized. For this reason it may be desired that the several plates 23 be retained in position as hereinabove described in a way which will assist in minimizing heat losses. For this reason, therefore, it may be desired to build up a plurality of such plates 23 into a sort of cage-like construction, one or more such cage-like constructions including all the plates 23. In other words, all the plates 23 may be secured into a single cage-like construction; or, alternatively, several such cage-like constructions may be disposed at various points along the kiln with a plurality of the plates 23 secured in each. In either event, any such cage-like construction is preferably built up of a plurality of the plates 23 tied together by a plurality (three as shown) of longitudinally extending members 31, which may be secured to the plates 23 in any desired way, for example, by welding. The longitudinally extending members 31 are preferably disposed so as to be relatively thin in cross-section as shown in the drawings and to be arranged with the longer dimension of the cross-section substantially parallel and adjacent to the wall of the kiln. Thus, these members 31 exert a minimum influence tending to lift portions of the solid material incident to the rotation of the kiln and drop such materials through the gases passing through the kiln onto the mass thereof adjacent to the bottom of the kiln. It has been found that such lifting devices, which are common in certain types of kilns and/or drier structures, may, in many instances, be undesired, particularly where the solid material being handled is wholly or partially in fine powdered form. Under such circumstances the fine solid materials, if dropped through the kiln gases, tend to be carried along by such hot gases and either lost, or the cost of recovery thereof is greatly increased, or both. It is preferred, therefore, to employ a construction which will minimize the lifting of substantial portions of the solid material incident to the rotation of the kiln.

In order that the cage-like constructions made up of a plurality of the plates 23 and a plurality of the longitudinally extending members 31 shall be anchored in the kiln so as to rotate therewith and not be moved substantially during the normal use of the kiln in handling solid material at relatively high temperatures, means are provided for anchoring such cage-like constructions to the cage walls, such means in the present case taking the forms of bolts 32 passing through the kiln walls and provided with suitable nuts or other securing means as shown at 33. This construction provides for a minimum of metallic material extending through the kiln walls, which could serve as a path for heat flow and thus serves to minimize heat losses through the walls of the kiln.

In the form of the invention shown in FIG. 5, the purpose is to abstract heat from the solid material being handled in the cylindrical rotary device generally indicated in that figure at 34. Such dissipation of heat is greatly augmented by the use of substantially planiform annular plates of good heat conducting material, such as metal, as in the form of the invention shown in FIGS. 1–4 and hereinabove described. In this case, however, as the problem is to abstract heat from the solid material, the direction of heat flow is reversed with respect to that in the form of FIGS. 1–4 and the annular plates 30 in this instance pick up heat by conduction from the solid material and transmit it to a place where it can be removed or dissipated. This heat removal may be accomplished in either or both of two ways. One of these ways is essentially similar to that described with respect to FIGS. 1–4 except that the gases passing through the kiln or the cylindrical device 34 in this instance are substantially cooler than the solid material. Under such circumstances a current of relatively cooler gases may be passed through the cylindrical device 34 under the influence of any suitable means effective to cause gas flow and in fact passes through the center portion inside the inner peripheries of the plates 30. No particular means are shown for accomplishing this as it will be thoroughly understood by those skilled in the art from the foregoing general description. In any event, when this expedient is resorted to, the construction could be the same as shown in FIGS. 1–4, with the exception that the gases passed through the device, in either direction with respect to the flow of solid material therethrough, would be substantially cooler than the solid material, so that the heat would flow by conduction from the solid material to the plates 30 and thence by convection from the plates 30 to the gases passing through the device.

The other expedient which may and probably would be resorted to in a device where the object is to abstract heat from the solid material is that of dissipating the heat through and from the walls of the device 34 itself. Under these circumstances, the wall shown at 35 is provided corresponding generally in construction to the wall 21 of the form of the invention shown in FIGS. 1–4. It is, however, not insulated either inside or outside as shown in FIG. 5. As the purpose is to increase the rate of heat transmission to and through the walls, it is desired to provide paths from the plates 30 to the wall 35 which will provide for the maximum heat transfer. Under such circumstances the plates 30 may be welded or otherwise suitably secured to the wall 35. As shown, spot welding is indicated at 36 for this purpose, although it will be understood that a continuous annular weld would probably be even better from the point of view of heat transfer by conduction from the plates 30 to the cylindrical wall 35.

Any suitable means may be provided for assisting in dissipating heat from the outside of the cylindrical wall 35. There is shown in FIG. 5 for this purpose a pipe 37 to which a cooling liquid is supplied by a pipe 38 and which extends a substantial distance around the device 34, with suitable spray nozzles 39 arranged at intervals for spraying cooling liquid onto the outside of the wall 35. Alternatively, it is contemplated that an arrangement could be provided by which a part of the cylindrical device 34 dipped into a trough of cooling liquid as water, such arrangement having been incorporated, disclosed and claimed in the pending application of Babcock et al., Serial No. 716,125, filed February 19, 1958, now Patent No. 2,986,460. From the point of view of the present invention, all that is desired is that some suitable means be provided for applying cooling liquid to assist in the dissipation of heat from the outside of the cylindrical rotary device 34.

While there is herein shown and described but a limited number of the possible alternatives or embodiments of which the present invention is susceptible, an attempt has been made as the description proceeded to explain the principles of the invention, so that equivalents will suggest themselves to those skilled in the art from the present description. It is intended that all such equivalents shall be considered within the purview of the present invention and the appended claims, which are to be construed validly as broadly as the state of the prior art permits.

What is claimed is:

1. A substantially cylindrical rotary kiln adapted for operation in a position in which the axis of said cylindrical kiln approaches the horizontal, but with one end higher than the other, so that solid materials supplied to the higher end will be moved by gravity coupled with the rotation of said kiln to the lower end thereof, means for supplying solid materials to the higher end of said kiln for treatment therein in a manner in which heat is to be supplied to said solid materials, means for rotating said kiln about its axis, means for supplying heated gases to the lower end of said kiln and for exhausting gases from the higher end of said kiln, so that gases will flow through said kiln in a direction generally countercurrent to the direction of flow of solid materials therethrough and will supply heat to the solid materials passing through said kiln, means for insulating the substantially cylindrical outer wall of said kiln so as to minimize heat loss therefrom through said wall, a plurality of substantially planiform annular plates of metallic material positioned inside said kiln adjacent to the inside periphery thereof and spaced from one another in the direction of said axis, each said plate being disposed in a plane substantially perpendicular to the axis of said kiln, each said plate extending in the plane thereof a predetermined distance toward said axis but substantially short of it, so as to be contacted by heat gases passing through said kiln and to absorb heat from said gases for transmission to said solid materials in the annular spaces between said plates, each of said plates and the inside of said device being substantially free of means acting to lift substantial portions of said solid materials incident to the rotation of said kiln, and each of said plates having at least one passage therethrough for said solid materials, so that said solid materials can pass from the upper end of said kiln to the lower end thereof without passing across the inner peripheries of any of said plates, said solid materials being in good heat transferring relation with said plates during the movement of said solid materials through said kiln, so that a substantial portion of the heat transferred to said solid material will be picked up by said plates from said gases and transmitted therethrough to said solid materials; wherein there is a cage construction wholly inside said kiln including a plurality of said annular plates, and means extending longitudinally of said kiln on the inside thereof for rigidly securing said plurality of annular plates together to form said cage construction; and means for anchoring said cage construction inside said kiln in a manner such as to minimize heat losses through the insulated wall thereof.

2. A substantially cylindrical rotary kiln in accordance with claim 1, wherein said cage construction is made up of a plurality of longitudinally extending members, each of which is secured to each of the plates of said cage construction, and wherein said longitudinally extending members are constructed and arranged so as to have a minimum tendency to lift the solid materials upon the rotation of said kiln; and wherein said anchoring means comprise a relatively few bolts secured to said cage and extending through the insulated outer wall of said kiln.

References Cited in the file of this patent

UNITED STATES PATENTS

| | | |
|---|---|---|
| 1,187,959 | Ash | June 20, 1916 |
| 1,791,403 | De Buch | Feb. 3, 1931 |
| 1,942,140 | Fasting | Jan. 2, 1934 |
| 2,410,598 | Cliffe | Nov. 5, 1946 |
| 2,603,561 | Swann | July 15, 1952 |
| 2,927,016 | Francis | Mar. 1, 1960 |
| 2,948,525 | West et al. | Aug. 9, 1960 |

FOREIGN PATENTS

| | | |
|---|---|---|
| 624,683 | Great Britain | June 14, 1949 |
| 905,375 | Germany | Mar. 1, 1954 |